(12) United States Patent
Ban et al.

(10) Patent No.: US 11,474,782 B2
(45) Date of Patent: Oct. 18, 2022

(54) INFORMATION PROCESSING APPARATUS, INFORMATION PROCESSING METHOD AND NON-TRANSITORY COMPUTER-READABLE MEDIUM

(71) Applicant: BROTHER KOGYO KABUSHIKI KAISHA, Nagoya (JP)

(72) Inventors: Ryoji Ban, Nagoya (JP); Satoki Nagao, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 22 days.

(21) Appl. No.: 17/210,437

(22) Filed: Mar. 23, 2021

(65) Prior Publication Data

US 2021/0303264 A1 Sep. 30, 2021

(30) Foreign Application Priority Data

Mar. 31, 2020 (JP) .............................. JP2020-063716
Mar. 31, 2020 (JP) .............................. JP2020-063717

(51) Int. Cl.
*G06F 3/12* (2006.01)
*G06F 3/16* (2006.01)
*G10L 15/22* (2006.01)

(52) U.S. Cl.
CPC ............ *G06F 3/167* (2013.01); *G06F 3/1204* (2013.01); *G06F 3/1253* (2013.01); *G10L 15/22* (2013.01); *G10L 2015/223* (2013.01)

(58) Field of Classification Search
None
See application file for complete search history.

(56) References Cited

U.S. PATENT DOCUMENTS

2019/0317703 A1 10/2019 Yamada et al.
2021/0295839 A1* 9/2021 Xu .................... H04M 1/72448

FOREIGN PATENT DOCUMENTS

JP 2019-185618 A 10/2019

* cited by examiner

*Primary Examiner* — Lennin R Rodriguezgonzalez
(74) *Attorney, Agent, or Firm* — Kenealy Vaidya LLP (57) ABSTRACT

An information processing apparatus includes: a communication interface; and a control device configured to: recognize a content of voice input by utterance of a user of an image forming apparatus from a smart speaker connected via the communication interface configured to input and output voice; and in a case the recognized content of voice includes designating a template and adding data to a template, specify the data from the recognized content of voice, add the specified data to the designated template, and transmit a command for image formation to the image forming apparatus.

25 Claims, 8 Drawing Sheets

| "NAME" TEMPLATE | USER A | USER B | USER C |
|---|---|---|---|
| TEMPLATE A | ○ | × | ○ |
| TEMPLATE B | × | ○ | × |
| TEMPLATE C | × | ○ | × |
| TEMPLATE D | ○ | × | × |
| TEMPLATE E | × | ○ | ○ |
| TEMPLATE F | ○ | ○ | ○ |

INFORMATION PROCESSING APPARATUS, INFORMATION PROCESSING METHOD AND NON-TRANSITORY COMPUTER-READABLE MEDIUM

CROSS-REFERENCE TO RELATED APPLICATIONS

This application is based on and claims priority under 35 USC 119 from Japanese Patent Application No. 2020-063716 filed on Mar. 31, 2020 and Japanese Patent Application No. 2020-063717 filed on Mar. 31, 2020, the contents of which are incorporated herein by reference.

TECHNICAL FIELD

The present disclosure relates to technology of controlling an image forming apparatus by voice.

BACKGROUND

A related art discloses a print system in which a predetermined phrase is pronounced, a game content is designated and a print apparatus is caused to perform printing based on the game content.

SUMMARY

One illustrative aspect of the present disclosure provides an information processing apparatus including: a communication interface; and a control device configured to: recognize a content of voice input by utterance of a user of an image forming apparatus from a smart speaker connected via the communication interface, the smart speaker being configured to input and output voice; and in a case the recognized content of voice includes designating a template and adding data to a template, specify the data from the recognized content of voice, add the specified data to the designated template, and transmit a command for image formation to the image forming apparatus.

According to the present disclosure, it is possible to conveniently input and print the voice-instructed character string in the template including the text input field.

Further, it is possible to search for image data as intended by the user by pronunciation and to use the same for image formation.

BRIEF DESCRIPTION OF DRAWINGS

Illustrative embodiments of the disclosure will be described in detail based on the following figures, wherein.

DETAILED DESCRIPTION

The above-described related-art print system is unable to meet a desire for inputting and printing a voice-instructed character string into a template including a text input field.

Further, in the above-described related-art print system, since it is not mentioned that the pronunciation and the function of searching for the image data are connected each other, it is not possible to search for image data as intended by a user by pronunciation and to use the same for image formation.

Therefore, one aspect of the present disclosure provides technology capable of conveniently inputting and printing a voice-instructed character string into a template including a text input field.

Another aspect of the present disclosure is to provide technology by which it is possible to search for image data as intended by a user by pronunciation and to use the same for image formation.

Hereinbelow, illustrative embodiments of the present disclosure will be described in detail with reference to the drawings.

First Illustrative Embodiment

Figure 1:
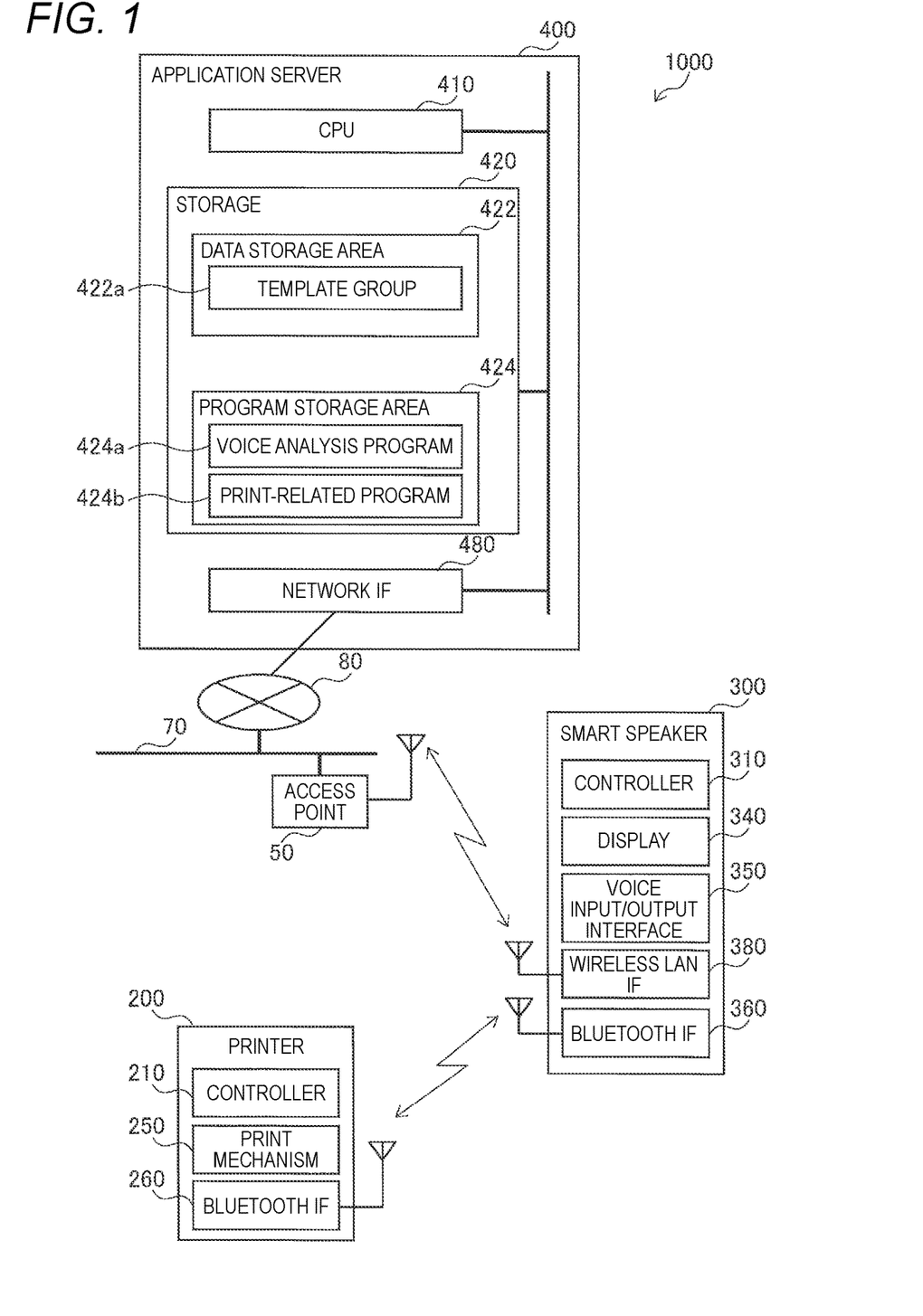
FIG. 1 is a block diagram depicting a configuration of an image forming system in accordance with a first illustrative embodiment of the present disclosure.

FIG. 1 is a block diagram depicting a configuration of an image forming system 1000 in accordance with a first illustrative embodiment of the present disclosure. The image forming system 1000 is mainly configured by a printer 200, a smart speaker 300, and an application server 400. Note that, in the image forming system 1000 of the present illustrative embodiment, the printer 200 and the smart speaker 300 are used by the same user.

An access point 50 that is used in the image forming system 1000 is configured to implement a function as an access point of a wireless LAN (abbreviation of Local Area Network) by using a communication method according to IEEE 802.11a/b/g/n standards, for example. The access point 50 is connected to a LAN 70. The LAN 70 is a wired network established in conformity to Ethernet (registered trademark), for example. The LAN 70 is connected to the Internet 80. The application server 400 is connected to the Internet 80.

The printer 200 includes a controller 210 including a CPU (abbreviation of Central Processing Unit) and a memory, a print mechanism 250 configured to perform printing according to control of the controller 210, and a Bluetooth IF (abbreviation of Interface) 260, for example. The print mechanism 250 is a mechanism configured to print an image on a sheet, and is a print mechanism of an electrophotographic method, an inkjet method, a thermal method or the like. The Bluetooth IF 260 is an interface that includes an antenna and is configured to perform short-range wireless communication in conformity to the Bluetooth method, and is used for communication with the smart speaker 300.

The smart speaker 300 is a device configured to execute specific processing, in response to voice uttered by a user. The specific processing includes, for example, processing of generating and transmitting voice data to the application server 400. The smart speaker 300 includes a controller 310 including a CPU and a memory, a display 340, a voice input/output interface 350, a Bluetooth IF 360, and a wireless LAN IF 380.

The display 340 is configured by a display device such as a liquid crystal monitor, an organic EL (abbreviation of Electro Luminescence) display and the like, a drive circuit configured to drive the display device, and the like.

The voice input/output interface 350 includes a speaker and a microphone, and is configured to execute processing relating to an input of voice and an output of voice. For example, the voice input/output interface 350 is configured to detect voice uttered by the user and to generate voice data indicative of the voice, under control of the controller 310. The voice input/output interface 350 is configured to generate voice corresponding to the received voice data, from the speaker.

The wireless LAN IF 380 includes an antenna and is configured to perform wireless communication by using a communication method according to IEEE 802.11a/b/g/n standards, for example. Thereby, the smart speaker 300 is connected to the LAN 70 and the Internet 80 via the access point 50, and is communicatively connected to the application server 400.

The Bluetooth IF 360 is an interface that includes an antenna and is configured to perform short-range wireless communication in conformity to the Bluetooth method, and is used for communication with the printer 200. Thereby, the printer 200 is communicatively connected to the application server 400 via the Bluetooth IF 260, the Bluetooth IF 360 of the smart speaker 300, the wireless LAN IF 380 of the smart speaker 300, the access point 50, the LAN 70 and the Internet 80.

The application server 400 is, for example, a server that is operated by a business operator that provides a so-called cloud service. The application server 400 includes a CPU 410 configured to control the entire application server 400, and a storage 420 including a ROM (abbreviation of Read Only Memory), a RAM (abbreviation of Random Access Memory), an HDD (abbreviation of Hard Disk Drive), an SSD (abbreviation of Solid State Drive), an optical disk drive, and the like. The application server 400 further includes a network IF 480 for connection to the Internet 80. Note that, although the application server 400 is conceptually shown as one server in FIG. 1, the application server 400 may also be a so-called cloud server including a plurality of servers communicatively connected to each other.

The storage 420 includes a data storage area 422 and a program storage area 424. The data storage area 422 is a storage area in which data necessary for the CPU 410 to execute processing, and the like are stored, and functions as a buffer area in which a variety of intermediate data, which is generated when the CPU 410 executes processing, are temporarily stored. In the data storage area 422, a template group 422a including a plurality of templates is also stored. The program storage area 424 is an area in which an OS (abbreviation of Operating System), an information processing program, a variety of other applications, firmware and the like are stored. The information processing program includes a voice analysis program 424a and a print-related program 424b. The voice analysis program 424a is uploaded and provided to the application server 400 by an operator of the application server 400, for example. The print-related program 424b is uploaded and provided to the application server 400 by a business operator that provides a print service by using resources of the application server 400, for example, a business operator that manufactures the printer 200, for example. Note that, all or some of the voice analysis program 424a may also be provided by the business operator that manufactures the printer 200, for example. Alternatively, all or some of the print-related program 424b may also be provided by the business operator that operates the application server 400.

The application server 400, particularly, the CPU 410 is configured to function as a voice analysis processor 424a' (refer to FIG. 2) by executing the voice analysis program 424a. The voice analysis processor 424a' is configured to execute voice recognition processing and morpheme analysis processing. The voice recognition processing is processing of analyzing voice data to generate text data indicative of a content of utterance indicated by the voice data. The morpheme analysis processing is processing of analyzing the text data to extract structural units (called morphemes) of words included in the content of utterance and to specify types of the extracted morphemes (for example, types of parts of speech).

The application server 400, particularly, the CPU 410 is also configured to function as a print-related processor 424b' (refer to FIG. 2) by executing the print-related program 424b. The print-related processor 424b' is configured to execute processing of generating a command for instructing the printer 200 to operate by using the text data obtained as a result of the analysis of the voice data, for example.

Figure 2:
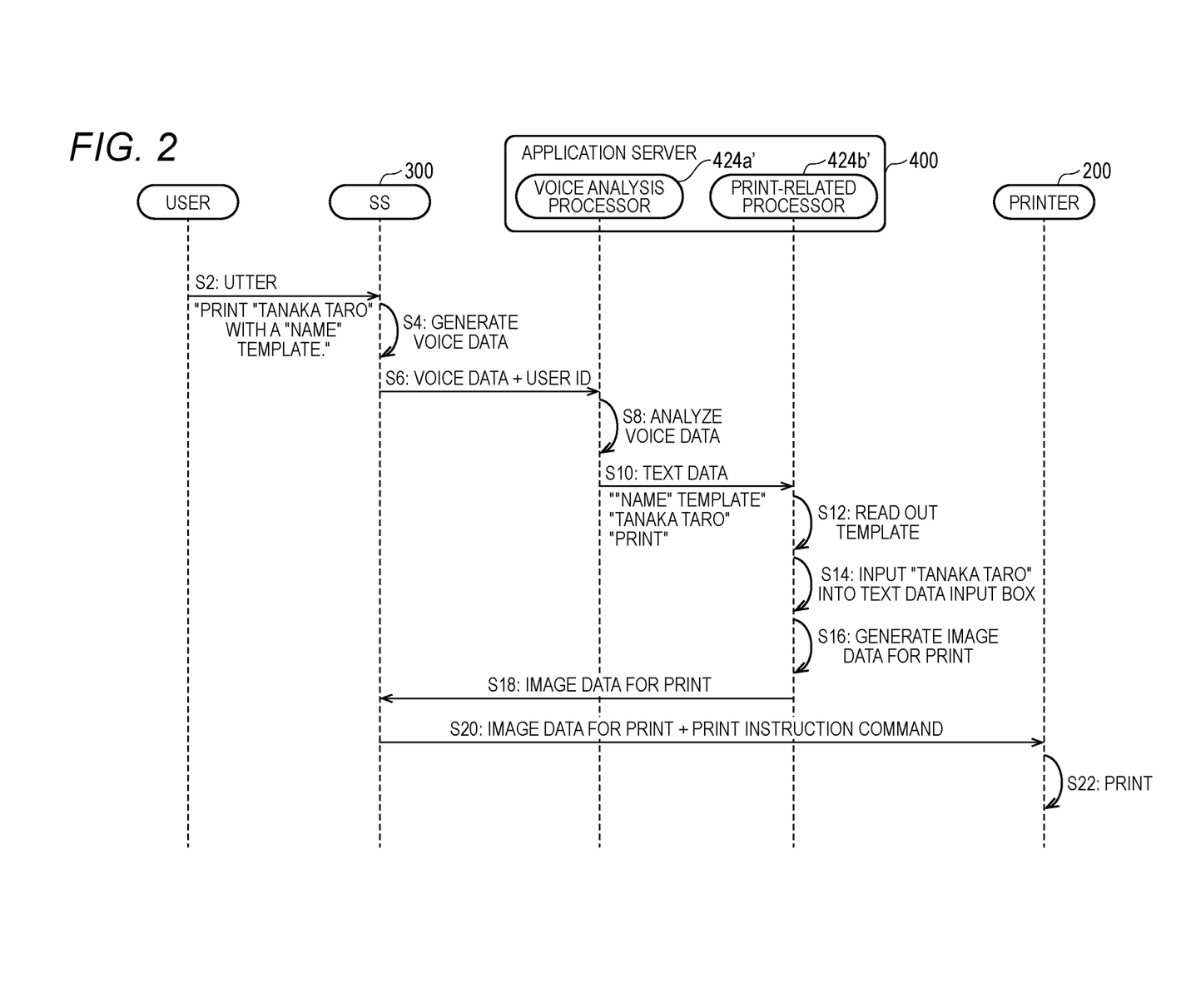
FIG. 2 is a sequence diagram of print control processing that is executed by the image forming system shown in FIG. 1.

FIG. 2 depicts a sequence of print control processing that is executed by the image forming system 1000. The print control processing is processing in which the smart speaker 300 and the application server 400 cooperate with each other to cause the printer 200 to execute printing.

In FIG. 2, the user utters in S2. Since the user wants to print using templates already registered in the application server 400, the user instructs the smart speaker 300 "Print "Tanaka Taro" with a "name" template.", for example. The print control processing starts when the smart speaker 300 detects the uttered voice.

In S4, the smart speaker 300 generates voice data indicating the voice uttered by the user. That is, when the voice "Print "Tanaka Taro" with a "name" template." is input to the smart speaker 300, the smart speaker 300 generates voice data indicating the voice.

Then, in S6, the smart speaker 300 transmits the voice data and a registered user ID (abbreviation of Identification or Identifier) to the voice analysis processor 424a' of the application server 400. The voice data is transmitted using a well-known protocol, for example, HTTP (abbreviation of Hyper Text Transfer Protocol). Note that, the smart speaker 300 can register a voiceprint of the user. The smart speaker 300 performs voiceprint recognition, based on the input voice, and transmits the user ID when the recognized voiceprint coincides with the registered voiceprint. Therefore, when the user ID is transmitted from the smart speaker 300, the voiceprint recognition has been already performed in the previous stage.

When the application server 400 receives the voice data and the user ID, in S8, the voice analysis processor 424a' of the application server 400 analyzes the received voice data. Specifically, the voice analysis processor 424a' executes the voice recognition processing on the voice data to generate text data indicative of the voice indicated by the voice data. For example, when the voice data indicating the voice "Print "Tanaka Taro" with a "name" template." is received, the voice analysis processor 424a' generates text data indicative of a content of the voice. The voice analysis processor 424a' further executes the morpheme analysis processing on the text data. Thereby, from the generated text data, for example, words such as ""name" template", "Tanaka Taro" and "Print" are extracted and types (for example, noun and verb) of parts of speech of the words are specified. The voice analysis processor 424a' generates a list in which the extracted words are associated with the types of parts of speech, as a morpheme analysis result.

Then, in S10, the voice analysis processor 424a' transfers the generated text data, the morpheme analysis result, and the user ID received from the smart speaker 300 to the print-related processor 424b'. Specifically, the voice analysis processor 424a' stores the text data, the morpheme analysis result and the user ID in a predetermined area of the data storage area 422, for example, and calls the print-related program 424b.

Figure 3A:
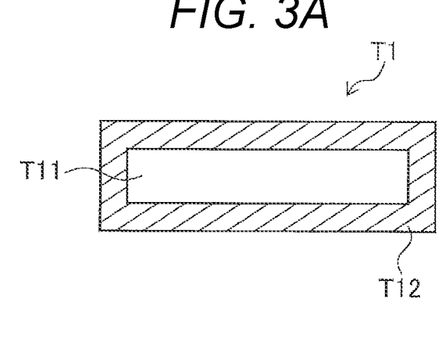
FIGS. 3A and 3B depict examples of templates.

When the text data, the morpheme analysis result and the user ID are received from the voice analysis processor 424a', in S12, the print-related processor 424b' executes template reading processing by using the text data and the morpheme analysis result. Specifically, the print-related processor 424b' searches for a template named "name" from the template group 422a. FIG. 3A depicts an example of a "name" template T1. The "name" template T1 is configured by a text data input box T11, and a background image T12.

Then, in S14, the print-related processor 424b' inputs "Tanaka Taro" into the text data input box T11 of the read "name" template T1. Then, the print-related processor 424b' converts the "name" template T1 in which "Tanaka Taro" is input into image data for print, in S16, and transmits the image data for print to the smart speaker 300, in S18.

Figure 3B:
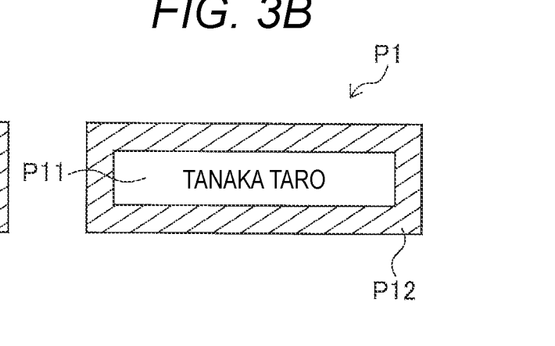

In S20, the smart speaker 300 transmits the received image data for print and a print instruction command for performing a print instruction thereof to the printer 200. The printer 200 receives the image data for print and the print instruction command, and executes printing, based on the image data for print, in S22. FIG. 3B depicts an example of a printed image P1 in which the text data "Tanaka Taro" is input to the text data input box T11 of the "name" template T1. In the printed image P1, a character string image P11 "Tanaka Taro" is inserted in an area of the text data input box T11 in the background image P12. In this way, the user can cause the printer 200 to print the printed image P1 having a name "Tanaka Taro" simply by uttering "Print "Tanaka Taro" with a "name" template.".

Figure 3C:
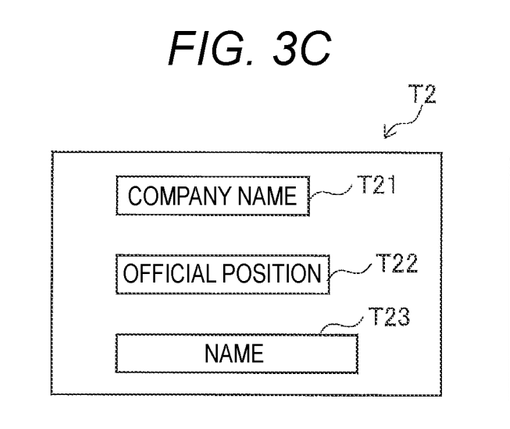
FIGS. 3C and 3D depict examples of printed images printed based on the templates.

FIG. 3C depicts an example of a "business card" template T2. The "business card" template T2 is different from the "name" template T1 shown in FIG. 3A, in that a plurality of (three, in the shown example) text data input boxes T21 to T23 are included. When inputting three types of text data to the three text data input boxes T21 to T23, the user pronounces while dividing character strings to be input. As a dividing method, for example, a method of inserting a silent pronunciation section to notify the smart speaker 300 that the division is made may be considered.

Then, the print-related processor 424b' inputs sequentially the three types of divided character strings into the text data input boxes T21 to T23, from that having a higher priority order. Specifically, the print-related processor 424b' inputs a character string, which indicates the first pronounced character string, i.e., a company name (for example "ABC Corporation"), into the text data input box T21, inputs a character string, which indicates the next pronounced character string, i.e., an official position (for example "section chief"), into the text data input box T22, and inputs a character string, which indicates the last pronounced character string, i.e., a name (for example "Tanaka Taro"), into the text data input box T23. Note that, the priority orders may be fixedly determined in advance, or the priority orders determined in advance may also be changed from the later priority order by the user.

Figure 3D:
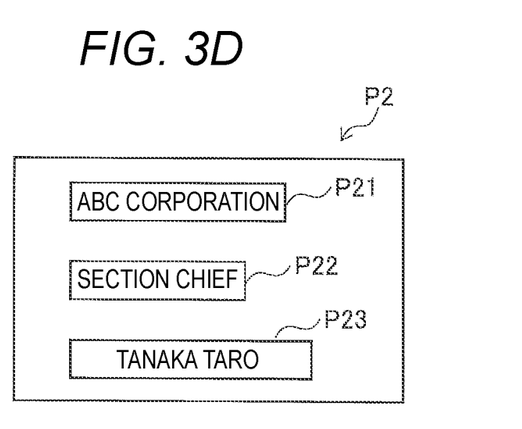

FIG. 3D depicts an example of a printed image P2 printed based on the "business card" template T2 shown in FIG. 3C. The printed image P2 is an image in which an image P21 of "ABC Corporation" is inserted in the position of the text data input box T21, an image P22 of "section chief" is inserted in the position of the text data input box T22 and an image P23 of "Tanaka Taro" is inserted in the position of the text data input box T23.

Each of the templates is denoted with a name, such as the "name" template T1 and the "business card" template T2. Therefore, the user can read out a template, which the user wants to use, from the data storage area 422 of the application server 400 and use the same for print simply by calling a name of the template. The template may also be prepared and registered on the application server 400 by the user. In this case, the user may prepare a template by using a terminal device that is not included in the image forming system 1000, such as a smartphone and a PC, then access the application server 400 and register the template on the application server 400.

Also, in a case where a plurality of text data input boxes is included, like the "business card" template T2, each of the text data input boxes can be denoted with a name, and the user may select a text data input box by calling the name thereof and input a pronounced character string into the text data input box. Thereby, the user can designate a text data input box in which the user wants to input a character string, and input the character string therein.

Figure 4:
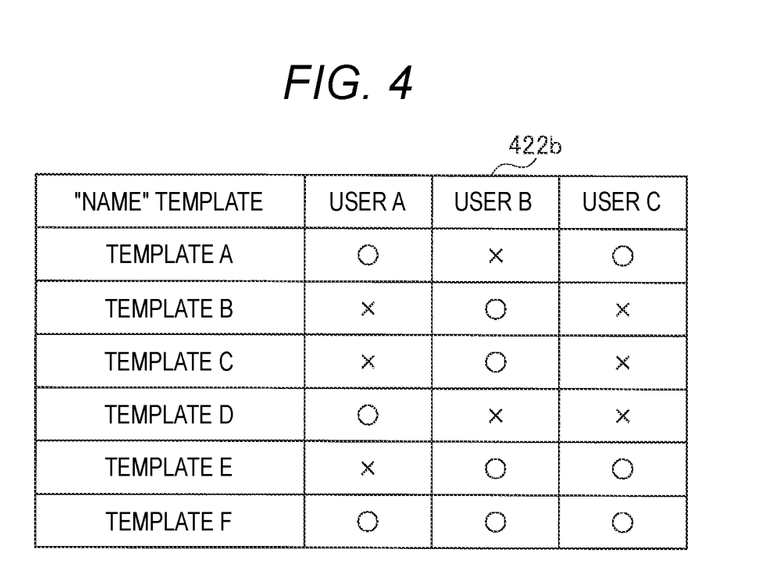
FIG. 4 depicts templates that are each limited to each of users who can use the templates.

FIG. 4 depicts an example of table data 422b, in a case where a user who can use a template is limited for each template. In FIG. 4, six types of templates A to F are exemplified as templates belonging to the "name" template T1. For example, a user A and a user C can use the template A, but a user B cannot use the same. The table data 422b is stored in the data storage area 422 of the application server 400, for example.

In the case where the user is limited for each template, like this, when reading out a template in S12, the print-related processor 424b' of the application server 400 reads out only a template that is permitted to be used by the user who utters. In S6, since the smart speaker 300 transmits the voice data to the application server 400, together with the user ID, the print-related processor 424b' can read out a template, which is permitted to a user indicated by the user ID, by referring to the table data 422b. Note that, if the template instructed to be read is not permitted to the user and the template cannot be thus read out, the application server 400 preferably generates voice data for notifying that the instructed template is a template not permitted to be used, and transmits the same to the smart speaker 300.

Also, when inputting a character string by utterance, the character string as intended by the user may not be input. For example, a Chinese character converted by Kana-Chinese character conversion may not be a Chinese character as intended by the user. In this case, if it is not possible to know whether a Chinese character is input as intended by the user unless it is actually printed, the printing cost and labor will be wasted.

In order to deal with this situation, when the smart speaker 300 receives the image data for print in S18, the image data for print is preferably previewed on the display 340. In this case, if the user does not like the previewed image data for print, the user may utter to the smart speaker 300 so as to preview other candidates.

By the utterance, the smart speaker 300 instructs the application server 400 to transmit other image data for print. In response to this, the print-related processor 424b' of the application server 400 converts the pronounced character string included in the previous utterance, i.e., the character string corresponding to "Kana" of the Kana-Chinese character conversion into another Chinese character, and inputs the converted Chinese character to the text data input box of the template to generate other image data for print. Then, the print-related processor 424b' transmits the generated other image data for print to the smart speaker 300.

The smart speaker 300 previews the received other image data for print on the display 340. The above sequence is repeated until the previewed image data for print becomes as intended by the user.

As described above, the application server 400 of the present illustrative embodiment includes the network IF 480, the storage 420 in which the plurality of templates each including one or more text input fields for inputting the text data, and the CPU 410. The CPU 410 recognizes a content of voice input by utterance of the user of the printer 200, from the smart speaker connected to the application server 400 via the network IF 480 and configured to input and output voice, and when the recognized content of voice is a content of designating the template T1 and inputting the pronounced character string into the text data input box T11 included in the template T1, the CPU 410 reads out the designated template T1 from the storage 420, extracts the text data corresponding to the pronounced character string from the recognized content of voice, inputs the extracted text data into the text data input box T11 included in the read template T1, converts the template T1 in which the text data is input to the text data input box T11 into the image data for print, and transmits the converted image data for print to the printer 200.

In this way, in the application server 400 of the present illustrative embodiment, simply by uttering "Print "Tanaka Taro" with a "name" template.", for example, it is possible to instruct the printer 200 to print the printed image P1 having the name "Tanaka Taro". Therefore, it is possible to conveniently input and print the voice-instructed character string into the template T1 including the text data input box T11.

Additionally, in the present illustrative embodiment, the application server 400 is an example of the "information processing apparatus". The network IF 480 is an example of the "communication interface". The storage 420 is an example of the "storage". The CPU 410 is an example of the "control device". The printer 200 is an example of the "image forming apparatus". The text data input box T11 is an example of the "text input field".

Also, each of the plurality of templates can be denoted with a name, and a template is designated by calling the name denoted to the template. Thereby, it is possible to designate the template more conveniently.

Also, users who can use the plurality of templates are each designated for each of the templates, a voiceprint is registered for each of the users, and the CPU 410 performs the voiceprint recognition, based on the input voice. When a designated template is a template that is permitted to be used by a user who has the recognized voiceprint, the CPU 410 reads out the designated template from the storage 420. Thereby, when the designated template is a template that is prepared and registered by the user and that the user does not want to disclose to others, the designated template is permitted to be used only by the user, which is convenient.

Also, when the designated template is not a template that is permitted to be used by the user who has the recognized voiceprint, the CPU 410 transmits the voice data, which pronounces that the designated template is a template that is not permitted to be used, to the smart speaker 300 via the network IF 480. Thereby, the user can know by voice the reason why the designated template is not read out, which is convenient.

Also, for a template in which a plurality of the text data input boxes T21 to T23 is included, each of the plurality of text data input boxes T21 to T23 can be denoted with a name. Therefore, when issuing an instruction to input the pronounced character strings into each of the plurality of text data input boxes T21 to T23, an instruction is made by calling names of the text data input boxes T21 to T23, an input of a character string is instructed by pronouncing the character string, and the CPU 410 inputs text data, which indicates the character string for which an input is instructed, into the text data input box whose name is called of the plurality of text data input boxes T21 to T23 included in the read template. Thereby, the user can designate the text data input box in which the user wants to input a character string, and input the character string, which is convenient.

Also, the CPU 410 previews the converted image data for print on the display connected via the network IF 480, and when the user utters an instruction to preview another candidate, in response to the preview, the CPU 410 extracts text data of another candidate corresponding to the pronounced character string, and inputs the extracted text data of another candidate into the text data input box T11 included in the read template. Thereby, since the user can check whether the image data for print is as intended by the user before actually performing printing based on the image data for print, it is possible to save the printing cost and labor.

Second Illustrative Embodiment

Hereinbelow, a second illustrative embodiment of the present disclosure will be described. Note that, parts different from the first illustrative embodiment are mainly described, and the descriptions overlapping the first illustrative embodiment are omitted or simplified.

Figure 5:
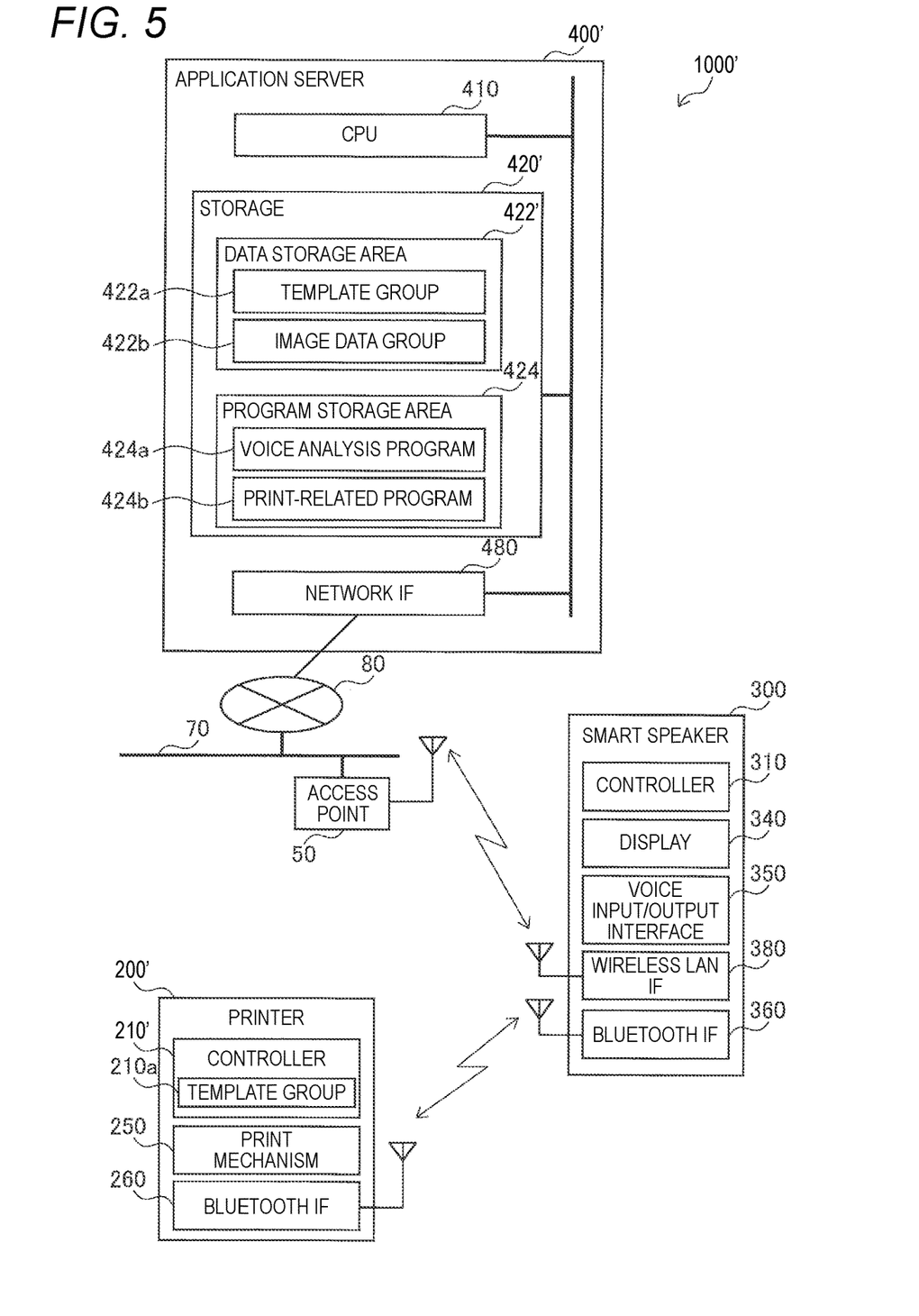
FIG. 5 is a block diagram depicting a configuration of an image forming system in accordance with a second embodiment of the present disclosure.

FIG. 5 depicts a configuration of an image forming system 1000' in accordance with a second illustrative embodiment of the present disclosure. The image forming system 1000' according to the second illustrative embodiment is mainly configured by a printer 200', a smart speaker 300, and an application server 400'.

In the second illustrative embodiment, a template group 210a including a plurality of templates is stored in a memory included in the controller 210' of the printer 200'.

In the second illustrative embodiment, a template group 422a including a plurality of templates and an image data group 422b including a variety of image data are also stored in the data storage area 422' of the storage 420' of the application server 400'.

Figure 6:
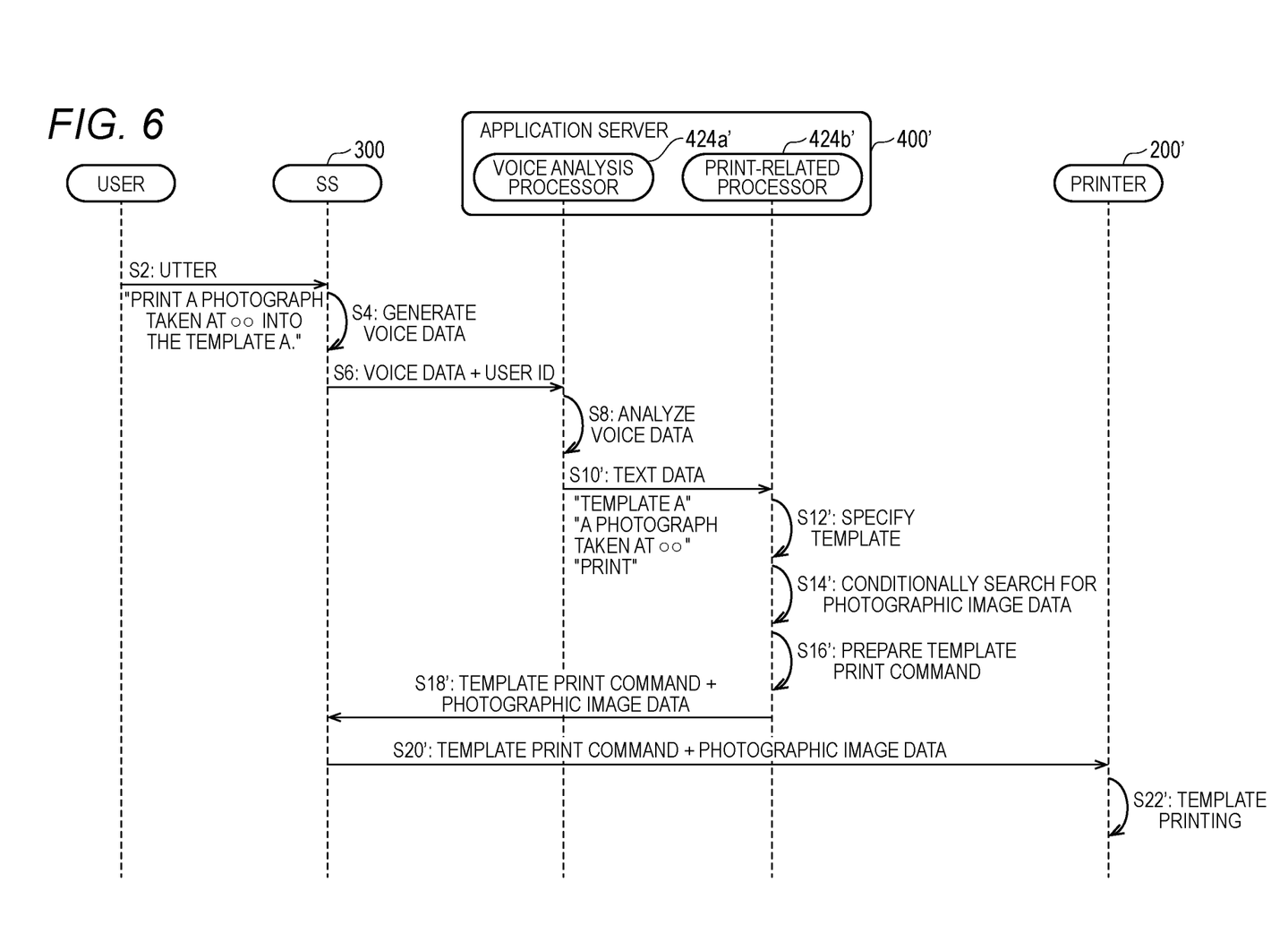
FIG. 6 is a sequence diagram of print control processing that is executed by the image forming system shown in FIG. 5.

FIG. 6 depicts a sequence of print control processing that is executed by the image forming system 1000'. The print control processing is processing in which the smart speaker 300 and the application server 400' cooperate with each other to cause the printer 200' to execute printing.

In FIG. 6, the user utters in S2. Since the user wants to print using templates already registered in the application server 400' or the printer 200', the user instructs the smart speaker 300 "Print a photograph taken at ∘∘ into the template A.", for example. The print control processing starts when the smart speaker 300 detects the uttered voice.

In S4, the smart speaker 300 generates voice data indicating the voice uttered by the user. That is, when the voice "Print a photograph taken at ∘∘ into the template A." is input to the smart speaker 300, the smart speaker 300 generates voice data indicating the voice.

Then, in S6, the smart speaker 300 transmits the voice data and a registered user ID to the voice analysis processor 424a' of the application server 400'.

When the application server 400' receives the voice data and the user ID, in S8, the voice analysis processor 424a' of the application server 400' analyzes the received voice data. Specifically, the voice analysis processor 424a' executes the voice recognition processing on the voice data to generate text data indicative of the voice indicated by the voice data. For example, when the voice data indicating the voice "Print a photograph taken at ∘∘ into the template A." is received, the voice analysis processor 424a' generates text data indicative of a content of the voice. The voice analysis processor 424a' further executes the morpheme analysis processing on the text data. Thereby, from the generated text data, for example, words such as "template A", "a photograph taken at ∘∘" and "Print" are extracted and types (for example, noun and verb) of parts of speech of the words are specified. The voice analysis processor 424a' generates a list in which the extracted words are associated with the types of parts of speech, as a morpheme analysis result.

Then, in S10, the voice analysis processor 424a' transfers the generated text data, the morpheme analysis result, and the user ID received from the smart speaker 300 to the print-related processor 424b'.

Figure 8A:
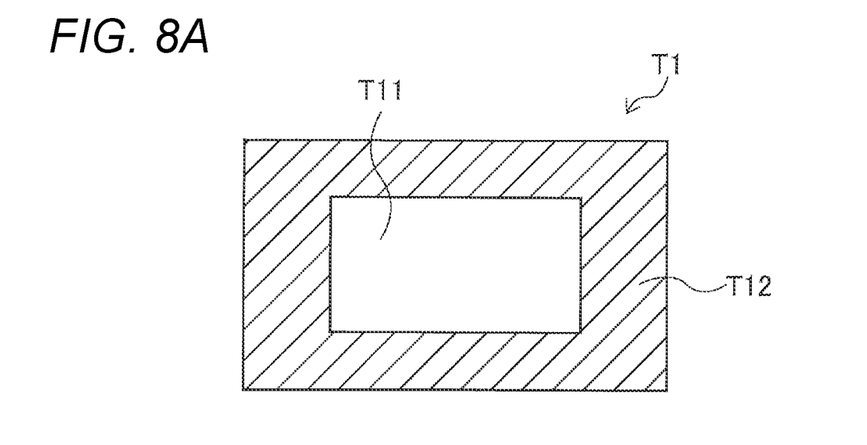
FIG. 8A depicts an example of a template.

When the text data, the morpheme analysis result and the user ID are received from the voice analysis processor 424a', in S12', the print-related processor 424b' executes template specifying processing by using the text data and the morpheme analysis result. Specifically, the print-related processor 424b' specifies whether the template A is stored in the application server 400' or in the printer 200'. For example, when it is determined that the template A is included in the template group 210a stored in the printer 200', the print-related processor 424b' specifies that the template A is a template in the printer 200'. FIG. 8A depicts an example of a "template A" T1. The "template A" T1 is configured by an image data input box T11, and a background image T12. Note that, the image data input box T11 has a rectangular shape in the shown example, but the present disclosure is not limited thereto. For example, a variety of shapes such as a circular shape, a heart shape and the like can also be adopted.

Then, in S14, the print-related processor 424b' conditionally searches for photographic image data from the image data group 422b by using the text data and the morpheme analysis result. Specifically, the print-related processor 424b' extracts photographic image data corresponding to "a photograph taken at ∘∘" from the image data group 422b.

For example, in a case where "∘∘" is "Kyoto", the print-related processor 424b' extracts photographic image data from the image data group 422b, as a search condition that a shooting location is Kyoto. Specifically, in a case where the photographic image data included in the image data group 422b is, for example, photographic image data according to Exif (abbreviation of Exchange image file format), the print-related processor 424b' extracts photographic image data whose position indicated by position information (geotag) included in meta data in the photographic image data is included in Kyoto Prefecture. When a shooting location is described in a comment area included in the meta data in the photographic image data, the print-related processor 424b' may also extract photographic image data matching the search condition, based on the shooting location.

On the other hand, in a case where the shooting location is not determined as one point, such as a case where "∘∘" is "Park", the print-related processor 424b' may perform the search based on a description content in the comment area, perform image recognition on a photographic image, and extract photographic image data showing the park.

Also, in a case where the user wants to template-print a "photograph of the user" instead of the "photograph taken at ∘∘", if image data of a user's face is registered in association with the user ID in the data storage area 422' of the storage 420' of the application server 400', for example, the print-related processor 424b' may perform the search based on a description content in the comment area, perform image recognition on a photographic image, and extract photographic image data showing the user, in a similar manner to the case where the shooting location is not determined as one point. Note that, in the present illustrative embodiment, as described above, it is assumed that the voiceprint recognition of the user is performed on the smart speaker 300-side and the voiceprint recognition of the user is already completed at the time when the smart speaker 300 transmits the user ID. However, the present disclosure is not limited thereto. For example, the voiceprint recognition of the user may be performed by the application server 400'. In this case, it is required that the voiceprint of the user should be registered in association with the image data of the user's face in the data storage area 422'.

Also, the user may designate diverse conditions, as the condition for searching for a photograph that is to be inserted in the template A, such as "photograph of a specific size", "photograph of a specific tone" and "photograph of a specific data format". However, when information corresponding to the designated condition is included in photographic image data of a search target, the print-related processor 424b' can extract photographic image data matching the search condition in a similar manner.

Note that, instead of the print-related processor 424b' searching for the photographic image data matching the search condition, the print-related processor 424b' may transfer the search condition to a service provider that saves photographic image data and provides a variety of services by using the saved photographic image data, and receive photographic image data matching the search condition from the service provider, thereby obtaining the photographic image data. For example, the print-related processor 424b' transfers the search condition to an API (abbreviation of Application Programming Interface) that is provided by a server that is operated by the service provider, and obtains photographic image data that is a response to the transfer.

Then, in S16, the print-related processor 424b' prepares a template print command. The template print command is a command that includes template specifying information for specifying a template to be used for print and instructs to input and print image data, which is to be transmitted together with the template print command, into an image data input box of a template specified by the template specifying information. Note that, in a case where a shooting date and time is included in the image data that is to be transmitted together with the template print command, i.e., the photographic image data and a date object is included in a template to be used for print, i.e., the template A, information about the shooting date and time may also be added to the template print command, as a setting value of the date object.

Then, in S18, the print-related processor 424b' transmits the prepared template print command and the extracted photographic image data to the smart speaker 300.

Then, in S20, the smart speaker 300 transmits the received template print command and photographic image data to the printer 200', as they are. The printer 200' receives the template print command and the photographic image data, and in S22, executes template printing. Specifically, the printer 200' reads out the template, which is indicated by the template specifying information included in the received template print command, i.e., the template A from the template group 210a. Then, the printer 200' inputs and prints the received photographic image data in the image data input box T11 (FIG. 8A) of the template A.

Figure 8B:
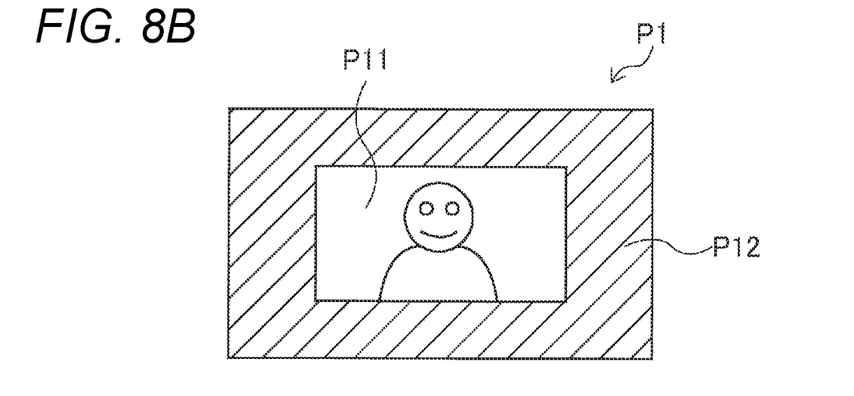
FIG. 8B depicts an example of printed image printed based on the template.

FIG. 8B depicts an example of a printed image P1 obtained by printing the received photographic image data into the image data input box T11 of the "template A" T1. The printed image P1 is an image in which a row image P11 of the photographic image data is inserted in an area of the image data input box T11 in the background image P12. In this way, the user can cause the printer 200' to print the printed image P1 having "Photograph taken at ○○" included therein simply by pronouncing "Print a photograph taken at ○○ into the template A".

Note that, it may also be possible to search for the photographic image data by adding a search condition, which is selected uniquely by the print-related processor 424b', to the search condition uttered by the user. The uniquely selected search condition is, specifically, a size of the image data input box T11. In this case, the print-related processor 424b' extracts photographic image data, which matches the conditions of "taken at ○○" and "size", from the image data group 422b.

The image data that is input to the image data input box T11 is not limited to the photographic image data. For example, a variety of image data such as a logo mark, a pattern, a picture and the like may also be input.

Figure 7:
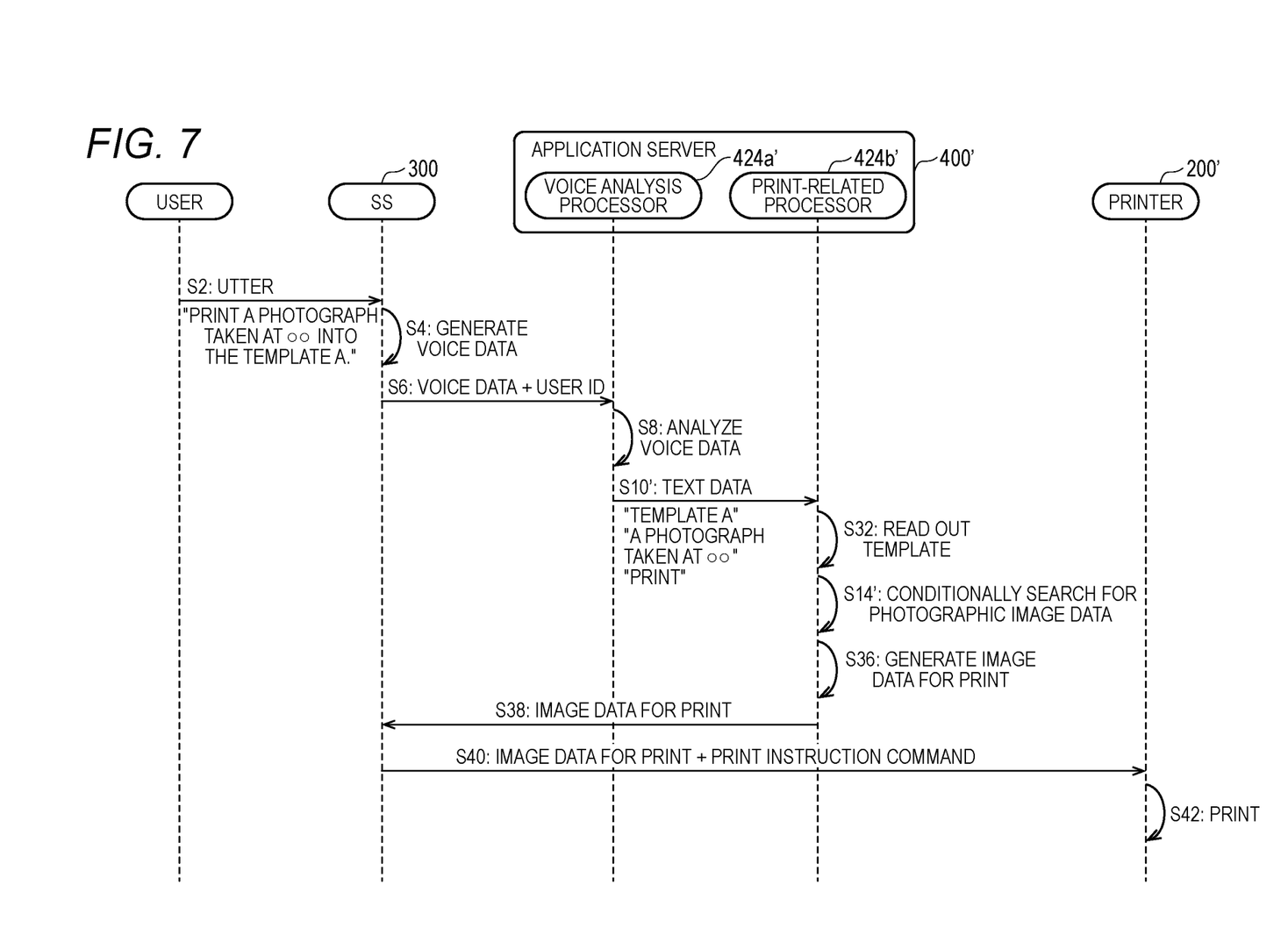
FIG. 7 is a sequence diagram of print control processing different from the print control processing shown in FIG. 6.

FIG. 7 depicts a sequence of print control processing that is executed by the image forming system 1000' when the template A is included in the template group 422a in the storage 420' of the application server 400'. The sequence of the print control processing shown in FIG. 7 is configured by changing some of the print control processing shown in FIG. 6. For this reason, the processing in FIG. 7 similar to the processing shown in FIG. 6 is denoted with the same reference signs, and the descriptions thereof are omitted.

In FIG. 7, in S32, the print-related processor 424b' executes template reading processing by using the text data and the morpheme analysis result. Specifically, the print-related processor 424b' searches for and reads out the template A from the template group 422a. Then, in S14, the print-related processor 424b' conditionally searches for and obtains photographic image data, as described above.

Then, in S36, the print-related processor 424b' inputs the obtained photographic image data into the image data input box T11 of the read "template A" T1, and converts the "template A" T1 in which the photographic image data is input into image data for print, and in S38, transmits the converted image data for print to the smart speaker 300.

In S40, the smart speaker 300 transmits, to the printer 200', the received image data for print, and a print instruction command to instruct printing thereof. The printer 200' receives the image data for print and the print instruction command, and in S42, executes printing based on the image data for print.

In this way, even when the template A is included in the template group 422a in the storage 420' of the application server 400', the user can cause the printer 200' to print the printed image P1 having "Photograph taken at ○○" included therein simply by pronouncing "Print a photograph taken at ○○ into the template A".

Figure 8C:
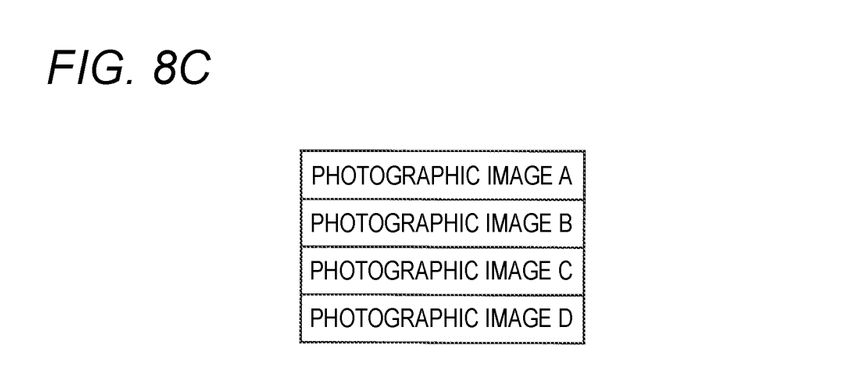
FIG. 8C depicts an example of a plurality of searched photographic images.

In S14, the print-related processor 424b' extracts one photographic image data by the conditional search. However, a plurality of photographic image data may also be extracted. FIG. 8C depicts an example where four photographic image data of photographic images A to D are extracted by the conditional search. Since only one image data input box T11 is included in the "template A" T1, the print-related processor 424b' needs to narrow down the photographic images A to D to any one photographic image. There are diverse narrowing methods.

Figure 9:
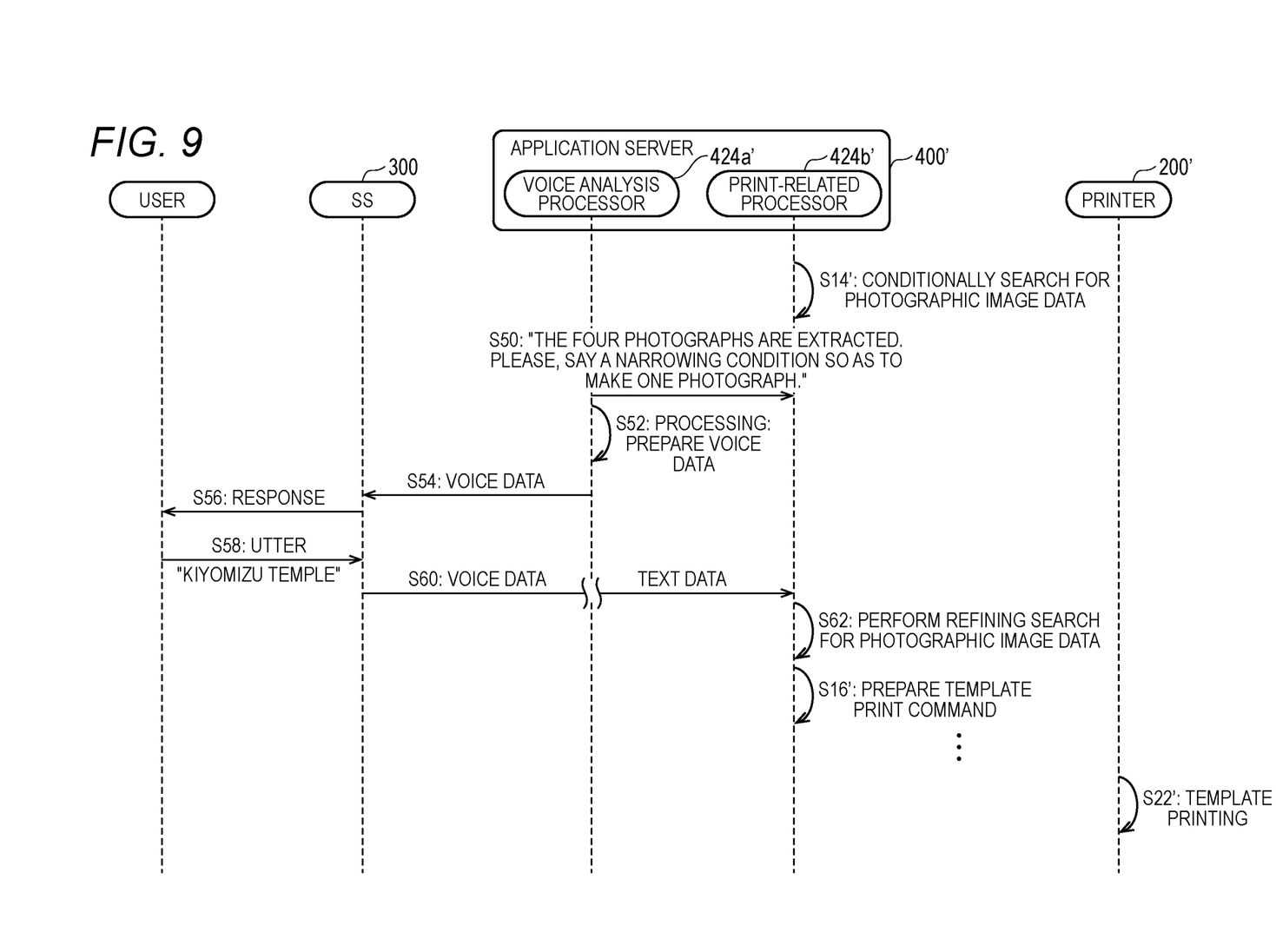
FIG. 9 is a sequence diagram of some of the print control processing that is executed by the image forming system shown in FIG. 5 when a plurality of photographic image data is extracted.

First, there is a method of prompting the user to utter a narrowing condition. FIG. 9 depicts an example of a sequence of print control processing that is executed in this case by the image forming system 1000'. Note that, the sequence shown in FIG. 9 depicts processing of S14 and thereafter of the sequence shown in FIG. 6.

In FIG. 9, in S50, the print-related processor 424b' generates, for example, text data of "The four photographs are extracted. Please, say a narrowing condition so as to make one photograph.", and transfers the text data to the voice analysis processor 424a'. In response to this, the voice analysis processor 424a' prepares voice data based on the text data, in S52, and transmits the voice data to the smart speaker 300, in S54.

In S56, the smart speaker 300 generates the received voice data, as voice. The user who hears the voice utters "Kiyomizu temple", for example, in S58. In response to this, the smart speaker 300 and the voice analysis processor 424a' execute processing similar to S4 to S10, generate voice data indicating the voice uttered by the user and text data based on the voice data and transfer the text data to the print-related processor 424b' (S60). In S62, the print-related processor 424b' adds the narrowing condition "Kiyomizu temple" to the current search condition "Kyoto", and performs refining search with the search conditions of "Kyoto"+"Kiyomizu temple". The above processing is repeated until the photographic image data becomes one. When the photographic image data becomes one, the print-related processor 424b', the smart speaker 300 and the printer 200' executes the processing of S16 to S22 to execute template printing.

Note that, the narrowing condition is not limited to a location, and may include a variety of conditions such as a shooting date and time (for example, a period with a predetermined range), a color (for example, "bright", "dark", etc.), a photographic subject (for example, "flower", "ship", etc.) and the like.

Also, a method of displaying the photographic images A to D on the display 340 of the smart speaker 300 and prompting the user to select any one may be exemplified. In this case, the print-related processor 424b' transmits the image data of the extracted photographic images A to D to the smart speaker 300. At this time, the print-related processor 424b' generates text data of "The four photographs are extracted. Please, select any one photograph", and generates voice corresponding to the text data from the smart speaker 300, in a similar manner to the above processing.

The user who hears the voice utters, for example "photograph A". In response to this, the smart speaker 300 and the voice analysis processor 424a' execute processing similar to the processing of S4 to S10 to generate text data and to transfer the text data to the print-related processor 424b'. In S14, the print-related processor 424b' obtains the photographic image data of the photographic image A. Note that, when displaying the photographic images A to D on the display 340, the higher the priority is, the photographic image is preferably displayed on the higher position. For example, it is considered to set a higher priority for a newer shooting date (including time).

Also, a method may be exemplified in which the print-related processor 424b' automatically selects any one photographic image from the photographic images A to D without hearing the user's intention. In this case, the print-related processor 424b' preferably selects the photographic image data having the highest priority. In addition to the priority, when there is a variation in sizes of the photographic images A to D, the photographic image data that is most suitable for the image data input box T11 may be selected. Further, when all of the photographic images A to D are larger than a size of the image data input box T11 and cannot be thus fitted therein unless they are reduced, the photographic image data that can be seen most easily when reduced may be selected.

As described above, the application server 400' of the present illustrative embodiment comprises the network IF 480, and the CPU 410. The CPU 410 recognizes a content of voice input by utterance of the user of the printer 200', from the smart speaker 300 connected via the network IF 480 and configured to input and output voice (S8). When the recognized content of voice is a content of designating the template A and instructing image formation with designating an attribute of the photographic image data to be inserted in the template A, the CPU 410 extracts the designated attribute of the photographic image data from the recognized content of voice, obtains the photographic image data having the extracted attribute (S14), and transmits, to the printer 200', a command for inserting and printing the obtained photographic image data into the designated template (S16 and S18).

In this way, in the application server 400' of the present illustrative embodiment, it is possible to search for the photographic image data conforming with the user's attention by pronunciation and to use the same for image formation.

Incidentally, in the present illustrative embodiment, the application server 400' is an example of the "information processing apparatus". The network IF 480 is an example of the "communication interface". The storage 420' is an example of the "storage". The CPU 410 is an example of the "controller". The printer 200' is an example of the "image forming apparatus". The template A is an example of the "template". The photographic image data is an example of the "image data". The printing is an example of the "image formation".

The CPU 410 further obtains the photographic image data, which meets the condition of the photographic image data to be inserted in the designated template, as the photographic image data to be obtained. Thereby, it is possible to obtain the photographic image data, which further conforms with the user's intention, and to perform the template printing.

Also, the application server 400' further includes the storage 420' in which image data of a face of a person and a voiceprint of voice uttered by the person are stored in association with each other. The CPU 410 performs voice-print recognition based on input voice, reads out image data of a face of a person having the recognized voiceprint from the storage 420', and further obtains, as the photographic image data to be obtained, photographic image data including the read image data of a face of a person. Thereby, it is possible to obtain the photographic image data, which further conforms with the user's intention, and to perform the template printing. Incidentally, the storage 420' is an example of the "first storage".

Also, when a shooting date and time is included in the transmitted photographic image data, the CPU 410 adds an instruction to insert the shooting date and time and to perform printing, to the command. Thereby, a print result in which the shooting date and time is automatically inserted is obtained. It is convenient. Incidentally, the shooting date and time is an example of the "date information".

Also, instead of transmitting the command, the CPU 410 obtains the designated template A (S32), inserts the obtained photographic image data into the obtained template A, converts the template A having the photographic image data inserted therein into the image data for print (S36), and transmits the converted image data for print to the printer 200' (S38). Thereby, even though the template A is not stored in the printer 200', if the template A is stored in the application server 400', it is possible to perform the template printing based on the template A. It is convenient.

Also, the CPU 410 transmits information indicative of the extracted attribute to another information processing apparatus connected via the network IF 480, and obtains photographic image data that is searched for and transmitted by another information processing apparatus, in response to the transmitted information, and has the extracted attribute. Thereby, since the application server 400' does not need to obtain the photographic image data having the extracted attribute, it is possible to reduce a load on the application server 400'.

Also, the application server 400' further includes the storage 420' in which a plurality of image data is stored, and the CPU 410 searches for and obtains the photographic image data having the extracted attribute from the storage 420' and another information processing apparatus connected via the network IF 480. Thereby, since it is possible to search for and obtain the user's intended photographic image data within a wider range, it is possible to obtain the photographic image data, which further conforms with the user's intention, and to perform the template printing. Incidentally, the storage 420' is an example of the "second storage".

Also, when the obtained photographic image data exceeds the number that can be inserted into the designated template, the CPU 410 transmits voice data of prompting the user to pronounce the narrowing condition for narrowing down the photographic image data to the smart speaker 300 via the network IF 480 (S50 to S54). In response to this, when the user pronounces the narrowing condition (S58), the CPU 410 narrows down the obtained photographic image data, based on the narrowing condition relating to the pronunciation (S62). Thereby, it is possible to obtain the photographic image data, which further conforms with the user's intention, and to perform the template printing.

Also, the CPU 410 previews the obtained photographic image data on the display 340 of the smart speaker 300 connected via the network IF 480. When the user pronounces to designate photographic image data that is to be adopted from the previewed photographic image data, the CPU 410 determines the designated photographic image data, as the photographic image data to be inserted into the template A. Thereby, it is possible to obtain the photographic image data, which further conforms with the user's intention, and to perform the template printing. Incidentally, the display 340 of the smart speaker 300 is an example of the "display".

Also, when there is a plurality of photographic image data to be previewed, the CPU 410 previews the plurality of photographic image data in order of priority. Thereby, the user can select the photographic image data while considering the priority. It is convenient.

Note that, the present invention is not limited to the above-described illustrative embodiment, and can be diversely changed without departing from the gist thereof (1) In the above illustrative embodiment, the processing of analyzing the voice data is executed by the voice analysis processor 424a' of the application server 400. Instead, some or all of the processing of analyzing the voice data may also be executed by the smart speaker 300. Some or all of the processing of analyzing the voice data may also be executed by the print-related processor 424b'. For example, the voice analysis processor 424a' may execute only the processing of executing the voice recognition processing to generate the text data, and the print-related processor 424b' may execute the morpheme analysis processing of extracting words. Some or all of the print-related processor 424b' may also be executed by the smart speaker 300 or by the printer 200 or another information terminal.

(2) In the above illustrative embodiment, as the image forming apparatus, the printer 200 is adopted. However, the present invention is not limited. For example, a complex machine having a scan function and a facsimile function in addition to a print function may also be adopted. In this case, for example, the complex machine may be caused to perform printing, in response to the voice input to the smart speaker 300.

(3) The application server 400 is a cloud server but may also be a local server that is connected to the LAN 70 and is not connected to the Internet 80. In this case, only the voice data may be transmitted without transmitting the identification information such as a user ID from the smart speaker 300 to the application server 400.

(4) The interface for connecting the smart speaker 300 and the printer 200 each other is not limited to the Bluetooth IF 260. For example, a wired interface such as a wired LAN and a USB (abbreviation of Universal Serial Bus), and other wireless interface such as a wireless LAN and NFC (abbreviation of Near Field Communication) may also be possible.

(5) In the above illustrative embodiment, some of configurations implemented by hardware may be replaced with software. To the contrary, some of configurations implemented by software may be replaced with hardware.

What is claimed is:

1. An information processing apparatus comprising:
a communication interface; and
a control device configured to:
recognize a content of voice input by utterance of a user of an image forming apparatus from a smart speaker connected via the communication interface, the smart speaker being configured to input and output voice; and
in a case the recognized content of voice includes designating a template and adding data to a template, specify the data from the recognized content of voice, add the specified data to the designated template, and transmit a command for image formation to the image forming apparatus.

2. The information processing apparatus according to claim 1, further comprising:
a storage storing a plurality of templates, each of the plurality of templates having one or more text input fields for inputting text data,
wherein the control device is configured to:
in a case the recognized content of voice further includes inputting a pronounced character string into a text input field included in the template,
read out the designated template from the storage,
as the specifying of the data, extract text data corresponding to the pronounced character string from the recognized content of voice,
input the extracted text data into the text input field included in the read template,
convert the template in which the text data is input to the text input field into image data for print, and
transmit the converted image data for print to the image forming apparatus.

3. The information processing apparatus according to claim 2,
wherein each of the plurality of templates is configured be denoted with a name, and
wherein the template is designated by calling a name denoted to the template.

4. The information processing apparatus according to claim 2,
wherein each of the plurality of templates is designated with a user who is permitted to use the respective template,
wherein a voiceprint is registered for each of the users, and
wherein the control device is configured to:
perform voiceprint recognition based on the input voice; and
in a case the designated template is permitted for a user who has the recognized voiceprint, read out the designated template from the storage.

5. The information processing apparatus according to claim 4, wherein in a case the designated template is not permitted for the user who has the recognized voiceprint, the control device is configured to transmit voice data to the smart speaker via the communication interface the voice data pronouncing that the designated template is not permitted.

6. The information processing apparatus according to claim 2,
wherein for a template including a plurality of text input fields, each of the plurality of text input fields being denotable with a name, and
wherein in a case receiving an instruction to input pronounced character strings into each of the plurality of text input fields, the instruction designating the text input fields by calling names of the text input fields, the instruction instructing an input of a character string by pronouncing the character string, the control device is configured to input text data into a respective text input field whose name is called of the plurality of text input fields included in the read template, the text data indicating the character string for which the input is instructed.

7. The information processing apparatus according to claim 2,
wherein the control device is configured to preview the converted image data for print on a display, the display being connected via the communication interface, and wherein in a case the user utters an instruction to preview a second candidate for the previewed image data in response to the preview, the control device is configured to:
- extract text data of a second candidate for the pronounced character string; and
- input the extracted text data of the second candidate into the text input field included in the read template.

8. The information processing apparatus according to claim 1, wherein in a case the recognized content of voice includes designating an attribute of image data to be inserted into the designated template and instructing the image formation, the controller is further configured to:
- as the specifying of the data,
  - extract the designated attribute of image data from the recognized content of voice, and
  - obtain image data having the extracted attribute; and
- as the transmitting of the command to the image forming apparatus, transmit a command for inserting the obtained image data into the designated template and performing the image formation.

9. The information processing apparatus according to claim 8, wherein the controller is configured to further obtain, as the image data to be obtained, image data that meets a condition of the image data to be inserted into the designated template.

10. The information processing apparatus according to claim 9, wherein the condition of the image data comprises a size, a color and a data format of image data.

11. The information processing apparatus according to claim 8, further comprising:
- a first storage storing image data of a face of a person and a voiceprint of voice uttered by the person in association with each other,
- wherein the controller is configured to:
  - perform voiceprint recognition based on the input voice;
  - read out image data of a face of a person having the recognized voiceprint from the first storage; and
  - further obtain, as the image data to be obtained, image data comprising the read image data of the face of the person.

12. The information processing apparatus according to claim 8, wherein in a case the transmitted image data includes date information, the controller is configured to add, to the command, an instruction to insert the date information and to perform the image formation.

13. The information processing apparatus according to claim 8, wherein instead of the transmitting the command, the controller is configured to:
- obtain the designated template;
- insert the obtained image data into the obtained template;
- convert the template having the image data inserted therein into image data for print; and
- transmit the converted image data for print to the image forming apparatus.

14. The information processing apparatus according to claim 8, wherein the controller is configured to:
- transmit information indicative of the extracted attribute to a second information processing apparatus connected via the communication interface; and
- obtain the image data having the extracted attribute, the image data having been searched and transmitted by the second information processing apparatus in response to the transmitting of the information.

15. The information processing apparatus according to claim 8, further comprising:
- a second storage storing a plurality of image data,
- wherein in the obtaining of the image data, the controller is configured to search for the image data having the extracted attribute from the second storage and a information processing apparatus, the second information processing apparatus being connected via the communication interface.

16. The information processing apparatus according to claim 8, wherein in a case the obtained image data exceeds the limit of number insertable into the designated template, the controller is configured to:
- transmit voice data of prompting a user to pronounce a narrowing condition for narrowing down the image data to the smart speaker via the communication interface; and
- in response to the voice data of prompting, in a case the user pronounces the narrowing condition, narrow down the obtained image data based on the pronounced narrowing condition.

17. The information processing apparatus according to claim 8, wherein the controller is configured to:
- preview the obtained image data on a display connected via the communication interface; and
- in a case the user pronounces to designate image data that is to be adopted from the previewed image data, determine the designated image data as the image data to be inserted into the template.

18. The information processing apparatus according to claim 17, wherein in a case there is a plurality of image data to be previewed, the controller is configured to preview the plurality of photographic image data in order of priority.

19. The information processing apparatus according to claim 8, wherein the attribute of image data comprises:
- a location at which the image data is captured;
- a date on which the image data is captured; and
- a photographic subject included in the image data.

20. An information processing method using an information processing apparatus, the information processing apparatus comprising a communication interface, the information processing method comprising:
- recognizing a content of voice input by utterance of a user of an image forming apparatus from a smart speaker connected via the communication interface, the smart speaker being configured to input and output voice; and
- in a case the recognized content of voice includes designating a template and adding data to the template,
  - specifying the data from the recognized content of voice,
  - adding the specified data to the designated template, and
  - transmitting a command for image formation to the image forming apparatus.

21. The information processing method according to claim 20, the information processing apparatus further comprising a storage storing a plurality of templates each comprising one or more text input fields for inputting text data, wherein the information processing method further comprises:
- in a case the recognized content of voice further includes inputting a pronounced character string into a text input field included in the template,
  - reading out the designated template from the storage,
  - as the specifying of the data, extracting text data corresponding to the pronounced character string from the recognized content of voice,
  - inputting the extracted text data into the text input field included in the read template, converting the template in which the text data is input to the text input field into image data for print, and transmitting the converted image data for print to the image forming apparatus.

22. The information processing method according to claim 20, wherein in a case the recognized content of voice further includes designating an attribute of image data to be inserted into the designated template and instructing image formation, the specifying of the data comprises:
extracting the designated attribute of image data from the recognized content of voice, and
obtaining image data having the extracted attribute, and
the transmitting of the command to the image forming apparatus comprises transmitting a command for inserting the obtained image data into the designated template and performing image formation.

23. A non-transitory computer-readable medium storing a computer program readable by a computer of an information processing apparatus, the information processing apparatus comprising a communication interface, the computer program, when executed by the computer, causing the information processing apparatus to perform:

recognizing a content of voice input by utterance of a user of an image forming apparatus from a smart speaker connected via the communication interface and configured to input and output voice; and
in a case the recognized content of voice includes designating a template and adding a data to the template,
specifying the data from the recognized content of voice,
adding the extracted data to the designated template, and
transmitting a command for image formation to the image forming apparatus.

24. The non-transitory computer-readable medium according to claim 23, the information processing apparatus further comprising a storage storing a plurality of templates each comprising one or more text input fields for inputting text data, wherein the computer program, when executed by the computer, further causes the information processing apparatus to perform:

in a case the recognized content of voice further includes
inputting a pronounced character string into a text input field included in the template,
reading out the designated template from the storage,
as the specifying of the data, extracting text data corresponding to the pronounced character string from the recognized content of voice,
inputting the extracted text data into the text input field included in the read template,
converting the template in which the text data is input to the text input field into image data for print, and
transmitting the image data for print converted in the conversion processing to the image forming apparatus.

25. The non-transitory computer-readable medium according to claim 23, wherein in a case the recognized content of voice further includes designating an attribute of image data to be inserted into the designated template and instructing image formation, the computer program, when executed by the computer, further causes the information processing apparatus to perform:

as the specifying of the data,
extracting the designated attribute of image data from the recognized content of voice, and
obtaining image data having the extracted attribute; and
as the transmitting of the command to the image forming apparatus, transmitting a command for inserting the obtained image data into the designated template and performing image formation.

* * * * *

UNITED STATES PATENT AND TRADEMARK OFFICE
CERTIFICATE OF CORRECTION

PATENT NO. : 11,474,782 B2
APPLICATION NO. : 17/210437
DATED : October 18, 2022
INVENTOR(S) : Ryoji Ban It is certified that error appears in the above-identified patent and that said Letters Patent is hereby corrected as shown below:

On the Title Page

1) Item (57) ABSTRACT, Line 7-8, replace the phrase "adding data to a template" with "adding data to the template"

In the Claims

2) Column 15, Line 63, in Claim 1, replace the phrase "adding to a template" with "adding to the template"

3) Column 16, Line 44, in Claim 5, add a "," immediately after the phrase "smart speaker via the communication interface"

4) Column 18, Line 4, in Claim 15, add the term "second" immediately after the phrase "extracted attribute from the second storage and a"

5) Column 18, Line 31, in Claim 18, remove the term "photographic" immediately after the phrase "plurality of"

Signed and Sealed this
Twenty-sixth Day of September, 2023

Katherine Kelly Vidal
*Director of the United States Patent and Trademark Office*